Dec. 5, 1967 D. I. POMERANTZ 3,356,915

MECHANICAL AND THERMOELECTRIC TRANSDUCERS

Filed April 1, 1966

INVENTOR
DANIEL I. POMERANTZ
BY
ATTORNEY 3,356,915
Patented Dec. 5, 1967

3,356,915

MECHANICAL AND THERMOELECTRIC TRANSDUCERS

Daniel I. Pomerantz, Lexington, Mass., assignor to P. R. Mallory & Co. Inc., Indianapolis, Ind., a corporation of Delaware Filed Apr. 1, 1966, Ser. No. 539,547
16 Claims. (Cl. 317—235)

The present invention relates to mechanical and thermoelectric transducers and more particularly to the means and methods for controlling an electrical current without using a current carrying contact.

Presently, conventional potentiometers are used to control electrical current. Potentiometers employ a resistive element and a moveable contact which is mechanically adjusted to provide a proper resistance. The movement of the moveable contact, sometimes referred to as the wiper, on the resistive element is a problem in many circuit applications. One problem is that the moveable contact must be firmly held against the resistive element. Thus, movement of the contact results in wear which changes the characteristics of the resistive element. As resistive elements wear, they tend to be nonlinear and definitely become unreliable. Another problem with potentiometers of the aforementioned type is that considerable electrical noise is generated in the connection between the resistive element and the moveable contact. This spurious noise is often detrimental in many circuit applications.

Accordingly, there is presented in this specification a semiconductive device for controlling electrical current without incurring the problems usually attributed to contemporary potentiometers. The present invention is additionally attractive in that a built-in device gain can be obtained by applying the proper signal to the proper electrodes of the device.

According to the present invention, a field-effect transistor having a source electrode, drain electrode and moveable or variable gate electrode is provided. The variations in the gate electrode configuration provides a means for controlling conduction between the source and drain electrode.

There is a high degree of similarity between a field-effect transistor and a triode vacuum tube. In a vacuum tube, the grid potential regulates the space charge existing between the cathode and plate and, therefore, determines the amount of plate current flow. In the field-effect transistor, the polarity of the gate governs the space charge existing in the semiconductive channel between the source and drain and, therefore, the amplitude of the current flowing from the source to the drain.

One of the most common field-effect transistors is a metal-oxide semiconductor field-effect transistor, usually referred to as a MOS field-effect transistor. These devices are usually formed in a semiconductor wafer by diffusing a source and drain into the wafer so as to define a channel therebetween, providing an insulating layer over the channel and the edge portions of the source and drain, and providing a gate electrode over the channel which is separated from the channel, source, and drain by the insulating layer. (This device is sometimes referred to as an insulated gate field-effect transistor.) The source and drain electrodes are heavily doped regions. The channel between the source and drain may be of the same conductivity type, n-type or p-type, as the source and drain only not as heavily doped or it may be of the opposite conductivity type, the same as the semiconductive wafer.

Another type of field-effect transistor is a thin film insulated gate field-effect transistor. Thin film field-effect transistors are usually constructed by evaporating or otherwise depositing a metallic source and drain electrode on a smooth and chemically inert substrate. A semiconductive material, such as cadmium sulfide, cadmium selenide, tellurium, gallium arsenide, etc., is evaporated or otherwise deposited over the channel between the source and drain and an insulating material, such as silicon monoxide, is evaporated or otherwise deposited over the semiconductive material. A metallic gate is then evaporated or otherwise deposited over the insulating material so as to be directly over the channel between the source and drain.

There are two modes of operation for insulated gate field-effect transistors. One mode is described as a depletion mode and the other is described as an enhancement mode. In the depletion mode, charge carriers are present in the channel between the source and drain and a reverse bias depletes this charge and reduces the channel conductance. The reverse bias is provided by a negative gate potential. In the enhancement mode, the charge carriers in the channel between the source and drain are enhanced by a forward bias to increase the channel conductance. The forward bias is provided by a positive gate potential. Therefore, transistors which exhibit significant channel conductance at zero gate bias are depletion-type transistors and transistors that show no channel conductance at zero bias are enhancement-type transistors.

In an enhancement-type transistor, especially a MOS field-effect transistor, the gate electrode covers the entire channel and overlaps both the source and drain regions. Any channel region which is left exposed by the gate produces a high series resistance to the device since there are few carriers in the channel at zero gate bias. The depletion-type transistor, however, does not require that the gate electrode overlap both source and drain regions. The series resistance produced by any unmodulated portion of the channel near the drain electrode is tolerable. However, any series source resistance introduces degeneration and is undesirable. Therefore, if the gate electrode does overlap, it should overlap the source region. (Channels of depletion type MOS field-effect transistors usually have the same conductivity type as the source and drain regions but are not as heavily doped.)

From the foregoing discussion it can be deduced that the position of the gate electrode of a field-effect transistor as well as the polarity of the potential applied to said gate electrode is an important element in controlling conduction between the source and drain electrode. Thus, if the gate electrode is polarized properly so as to produce a conductance path between the source and drain, movement of the electrode so as to change the cross section of the conducting path will change the conduction characteristics of the field-effect device.

By utilizing a moveable or variable gate electrode, therefore, a voltage dividing device can be provided. By making the configuration of the gate electrode temperature dependent, a thermoelectric transducer can be provided and by making the configuration of the gate electrode variable by sound, a microphone can be provided.

Other features and possibilities for the device of the present invention will become apparent as this specification progresses.

It is an object of the present invention, therefore, to provide a semiconductive device for use in a circuit as a variable impedance element.

It is another object of the present invention to provide a variable impedance element having no wiper element through which current must flow.

It is a further object of the present invention to provide a variable impedance element which does not inherently generate electrical noise.

It is yet another object of the present invention to provide a device for controlling electrical conduction which has a built-in gain feature.

It is still another object of the present invention to provide a field-effect transistor having a source electrode, drain electrode, and gate electrode and a means for moving said gate electrode so as to vary current flow between said source and drain electrodes.

It is still a further object of the present invention to provide a field-effect transistor which can be used as a thermoelectric transducer.

It is still another object of the present invention to provide a field-effect transistor having a gate electrode which expands and contracts with temperature changes.

It is still a further object of the present invention to provide a means for moving the gate electrode of a field-effect transistor so as to vary the impedance between the source and drain electrodes of said transistor.

It is another object of the present invention to provide a means for controlling electrical conduction which is very small and light.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a transducer comprising a field-effect transistor having a moveable gate electrode and a means for moving the gate electrode with respect to the channel between the source and drain electrodes so as to vary the conduction characteristics of the transistor. In one embodiment of the present invention the gate electrode is liquid metal that will expand and contract along the channel of the field-effect transistor in response to temperature changes. Thus, the transducer of the present invention can readily be a thermoelectric transducer. In another embodiment, the liquid metal expands and contracts along the channel in response to sound waves. Thus, the transducer of the present invention can readily be a microphone.

Figure 1:
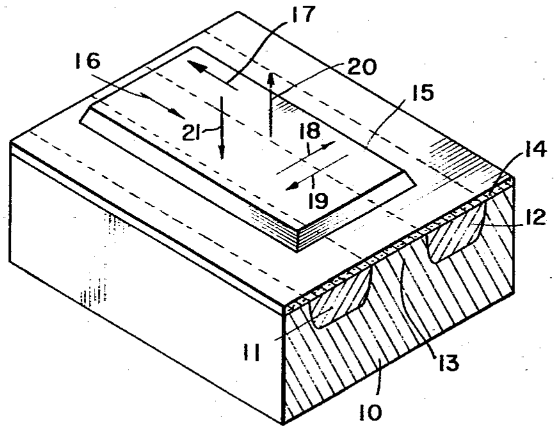
FIGURE 1 is a perspective view of a field-effect transistor having a moveable gate electrode.

Referring now to the drawing, and particularly to the perspective view of FIGURE 1, the structure of the present invention can be visualized in conjunction with the following description.

The field-effect transistor shown in FIGURE 1 is formed on and in a semiconductive wafer 10. The wafer may be either n-type or p-type material depending on the requirements for the device. In most cases today, the wafer 10 is an essentially monocrystalline body of silicon formed by any of the known crystal growing techniques, cut and polished to obtain a very smooth wafer. Silicon is especially attractive because it is readily available and the individual process techniques such as epitaxial growth, oxide masking, and impurity diffusion are better known for silicon than for other semiconductive materials.

A source 11 and drain 12 are diffused into the wafe 10 so as to provide a channel 13 therebetween. The dashed lines in FIGURE 1 show that the source 11 and drain 12 are elongated and extend transversely along the wafer 10. The source 11 and drain 12 are one conductivity type and the wafer 10 is the opposite conductivity type. For instance, if the wafer 10 is high resistivity p-type silicon, the source 11 and drain 12 will be n-type regions diffused into the wafer 10. As stated previously, the channel 13 between the source 11 and drain 12 may be the same conductivity type as the source and drain but not as heavily doped or it may be of the opposite conductivity type, the same as the wafer 10.

A gate 15 is provided over the channel 13 which is separated from the channel 13 and the source 11 and drain 12 by an insulating layer 14. The gate 15 can be metal such as aluminum, nickel, or gold. The insulating layer 14 will usually be silicon dioxide.

The gate 15 is movable in the direction of the arrows 16 and 17, 18 and 19, and 20 and 21. Motion in the directions 16 and 17 produces a change in conductivity between source and drain which is linearly related to the amount of motion. Motion in the directions 18 and 19 produces an abrupt change in conductivity at a point where the gate overlaps one junction, for a depletion mode device, or both junctions, for an enhancement mode device. This is similar to the action of a switch. Motion of the gate electrode 15 normal to the wafer, in the direction of the arrows 20 and 21, will also produce a variable impedance effect because the field produced by the gate electrode is rather shallow.

The dimensions of the wafer 10, source 11, drain 12, channel 13, insulating layer 14 and gate 15 depend, of course, on the desired characteristics of the transistor. The limitation of the present invention is that movement of the gate 15 must change the impedance or conduction characteristics of the device. From the foregoing discussion, it is obvious that movement of the gate 15 in the direction of the arrows 16 and 17 will have the most controlled effect on the conduction characteristics of the device.

For successful operation, the moveable gate 15 will usually be in intimate contact with the insulating layer 14. This is true because the electrical field produced by the gate 15 must penetrate the channel 13 between the source 11 and drain 12.

Figure 2:
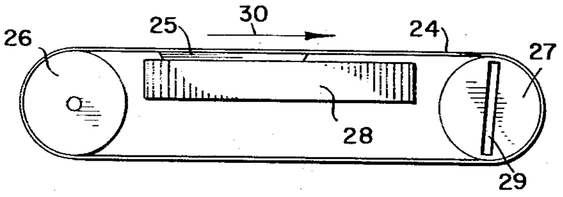
FIGURE 2 is an illustrative means for moving the gate electrode of a field-effect transistor.

Referring now to FIGURE 2, an illustrative means for moving the gate of a field-effect transistor with respect to the channel between the source and drain can be discussed.

There is a continuous tape 24 having a metallized portion 25 disposed about two spools 26 and 27 so as to be moveable with respect to a wafer 28 containing a field-effect transistor. The spool 27 is provided with a slot 29 which can be used in conjunction with a small screw driver to move the metallized portion 25 in the direction of the arrow 30. In this embodiment, the channel between the source and drain of the field-effect transistor extends in the direction of the arrow 30 and the metallized portion 25 of the tape 24 is disposed directly over the channel.

Another and similar approach for moving the gate electrode of a field-effect transistor with respect to the channel between the source and drain is to hold the gate electrode in a fixed position and move the wafer containing the field-effect transistor. This can be easily accomplished with the lead screw arrangement used on most small potentiometers. That is, the gate electrode will be the wiper that is slightly spring loaded against the wafer. The wafer will be mounted on a carrier that is adjusted by means of a finely threaded lead screw.

It is believed that the various means and methods for moving the gate electrode are purely mechanical in nature and need not be discussed further in this specification.

Figure 3:
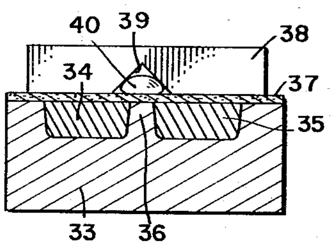
FIGURE 3 is a sectional view of a field-effect transistor having a liquid metal gate electrode.

Referring now to FIGURE 3, a cross section view of a field-effect transistor having a liquid metal gate electrode can be discussed.

The field-effect transistor is formed on and in the semiconductor wafer 33. A source 34 and drain 35 are diffused into the wafer 33 so as to define a channel 36 therebetween. An insulating layer 37 is grown or otherwise deposited over the wafer 33. A member 38 having an elongated V-shaped opening or reservoir 39 formed therein is bonded or otherwise securely affixed to the insulating layer. It can be seen that the opening 39 is adapted to be over the channel 36 and to slightly overlap the source 34 and drain 35. The opening 39 is also adapted to extend along the channel 36.

Liquid metal 40 is fed into the opening 39 so as to provide a gate electrode for the field-effect transistor. Thus, as the liquid metal 40 advances and withdraws in the opening 39, the conduction characteristics of the field-effect transistor changes accordingly.

The member 38 can be glass which is bonded to the insulating layer 37. The V-shaped opening 39 can be etched or otherwise formed in the member 38. The liquid metal 40 will most likely be mercury.

A manually operated pump means containing liquid metal can be connected to the opening 39 as a means for advancing and withdrawing the liquid metal 40 along the channel 36. The pump means containing the liquid metal must be provided with an electrode for connecting the liquid metal to the proper potential. In a similar manner, the opening 39 can be used as a capillary tube of a thermometer so that expansion and contraction of the liquid metal 40 therein with changes in temperature will change the conduction characteristics of the field-effect transistor.

The liquid metal gate electrode of the present invention can be adapted so as to expand and contract in response to sound wave inputs. Thus, the present invention can be used as a microphone. In the microphone application, the liquid metal would be in contact with a diaphragm or similar device responsive to sound. In another modification, a microphone can be made by connecting a sound actuated diaphragm to the gate electrode directly causing it to move either parallel or perpendicular to the surface of the field-effect device.

Figure 4:
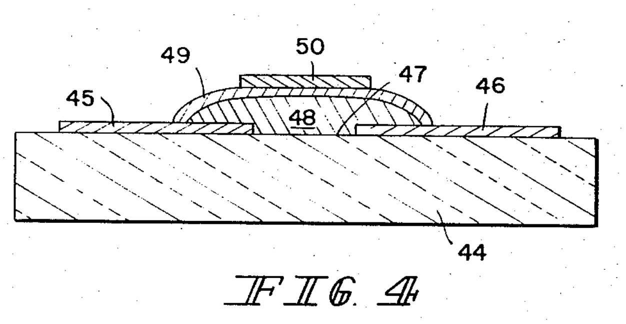
FIGURE 4 is a sectional view of a thin film field-effect transistor having a moveable gate.

Referring now to FIGURE 4, a thin film field-effect transistor with a moveable gate electrode can be discussed.

The thin film field-effect transistor is formed on an inert substrate 44. The substrate may be sapphire, glass, ceramic or any similar material which has a smooth and flat surface. A metallic source 45 and drain 46 are evaporated or otherwise formed on the substrate 44 so as to define a channel 47 therebetween. The source 45 and drain 46 may be aluminum, nickel, gold, or any similar material which has suitable conducting characteristics and that will bond to the substrate 44. A semiconductor material 48 such as cadmium sulfide, cadmium selenide, tellurium, or gallium arsenide is deposited over the channel 47 between the source 45 and drain 46. An insulating layer 49 is deposited over the semiconductor material 48. A moveable gate electrode 50 is disposed over the channel 47 so as to slightly overlap the source 45 and drain 46. The gate electrode 50 can be moved with respect to the channel 47 by any of the methods previously described.

The transducer of the present invention, as hereinbefore described in several embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A transducer comprising: a field-effect transistor having a source electrode and drain electrode separated by a channel, an insulating layer covering said source and drain electrodes and said channel, and a gate electrode disposed over said channel and separated therefrom by said insulating layer; means for applying a predetermined potential to said gate electrode; and means for moving said gate electrode with respect to said channel so as to control the conduction characteristics of said field-effect transistor.

2. A transducer as in claim 1 wherein said gate electrode is liquid metal contained in a reservoir disposed directly above said channel and opening towards said channel and said means for moving said gate electrode with respect to said channel is a means for advancing and withdrawing said liquid metal in said reservoir so as to vary the conduction characteristics of said field-effect transistor.

3. A transducer as in claim 1 wherein said gate electrode is liquid metal contained in a reservoir disposed directly above said channel and opening towards said channel, said liquid metal being adapted to respond to temperature changes by expanding and contracting in said reservoir, so as to vary the conduction characteristics of said field-effect transistor.

4. A transducer as in claim 1 wherein said gate electrode is liquid metal contained in a reservoir disposed directly above said channel and opening towards said channel, said liquid metal being adapted to respond to sound waves by advancing and withdrawing in said reservoir so as to vary the conduction characteristics of said field-effect transistor.

5. A transducer as in claim 1 wherein said means for moving said gate electrode with respect to said channel comprises: a tape having a gate electrode thereon, said tape being carried by a pair of spools and disposed so as to be directly above said channel; and means for rotating said spools so as to move said gate electrode with respect to said channel so as to vary the conduction characteristics of said field-effect transistor.

6. A transducer as in claim 1 wherein said source and drain electrodes are metallic regions deposited on an inert substrate and said channel contains a semiconductor material of a predetermined conductivity type.

7. A variable impedance means comprising: a field-effect transistor having an elongated source and drain electrode disposed so as to define an elongated channel therebetween, an insulating layer for covering said source and drain electrode and said channel, and an elongated gate electrode directly disposed over said channel and separated therefrom by said insulating layer, said gate electrode being intimately contacted with said insulating layer and moveable in the elongated direction of said channel; means for applying a predetermined potential to said gate electrode; and means for moving said gate electrode with respect to said channel so as to control the conduction characteristics of said field-effect transistor.

8. A variable impedance means as in claim 7 wherein said source and drain electrodes are n-type regions diffused into a p-type semiconductor wafer.

9. A variable impedance means as in claim 7 wherein said source and drain electrodes are p-type regions diffused into an n-type semiconductor wafer.

10. A variable impedance means as in claim 8 wherein said channel is an n-type region, said channel region being lightly doped and said source and drain electrodes being heavily doped.

11. A variable impedance means comprising; a metal oxide semiconductor device having a source electrode and drain electrode diffused into a semiconductor wafer so as to define a channel therebetween, an insulating layer covering said source and drain electrode and said channel, and a gate electrode disposed over said channel and separated therefrom by said insulating layer, said gate electrode being intimately contacted with said insulating layer; means for connecting said gate electrode to a proper potential; and means for moving said gate electrode with respect to said channel so as to control the conduction characteristics of said semiconductor device.

12. A variable impedance means as in claim 11 wherein said source and drain electrodes are elongated regions diffused into a semiconductor wafer so as to define an elongated channel therebetween and said gate electrode is moveable in the elongated direction of said channel.

13. A variable impedance means as in claim 11 wherein said source and drain electrodes are n-type regions and said semiconductor wafer is a p-type semiconductor material.

14. A variable impedance means as in claim 11 wherein said semiconductor wafer is an essentially monocrystalline body of silicon.

15. A variable impedance means as in claim 11 wherein said semiconductor wafer is an essentially monocrystalline body of high resistivity p-type silicon.

16. A thermoelectric transducer comprising: a field-effect transistor having a source electrode and drain electrode separated by a channel and an insulating layer covering said source and drain electrodes and said channel; a member having a reservoir disposed directly above said channel and opening towards said channel, said member being firmly held to said insulating layer, said reservoir containing a liquid metal which expands and contracts in said reservoir with changes in temperature; and means for connecting said liquid metal to a proper electrical potential so as to control conduction between said source and drain electrodes.

References Cited

UNITED STATES PATENTS

| | | | |
|---|---|---|---|
| 2,627,545 | 2/1953 | Muss et al. | 175—366 |
| 2,734,154 | 2/1956 | Pankove | 317—235 |
| 2,874,340 | 2/1959 | Lehovel | 317—236 |
| 3,016,752 | 1/1962 | Huebschmann | 73—517 |

JOHN W. HUCKERT, *Primary Examiner.*

J. SHEWMAKER, *Assistant Examiner.*